(12) United States Patent
Lindgren

(10) Patent No.: US 8,213,486 B2
(45) Date of Patent: Jul. 3, 2012

(54) METHOD FOR SIMPLIFYING THE CALCULATIONS FOR PRE-WHITENING IN A G-RAKE RECEIVER

(75) Inventor: Ulf Lindgren, Västra Frölunda (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 713 days.

(21) Appl. No.: 12/447,292

(22) PCT Filed: Oct. 27, 2006

(86) PCT No.: PCT/SE2006/050434
§ 371 (c)(1),
(2), (4) Date: Apr. 27, 2009

(87) PCT Pub. No.: WO2008/051128
PCT Pub. Date: May 2, 2008

(65) Prior Publication Data
US 2010/0074300 A1 Mar. 25, 2010

(51) Int. Cl.
*H04B 1/00* (2006.01)
(52) U.S. Cl. .......................... 375/148; 375/144
(58) Field of Classification Search .................. 375/130, 375/142, 144, 147, 148, 150, 343
See application file for complete search history.

(56) References Cited

U.S. PATENT DOCUMENTS

| | | | | |
|---|---|---|---|---|
| 6,947,403 B2 * | 9/2005 | Heikkila et al. | ............... | 370/335 |
| 7,161,974 B2 * | 1/2007 | Mehrabani et al. | ........... | 375/148 |
| 2004/0114695 A1 * | 6/2004 | Astely et al. | ................... | 375/343 |
| 2005/0101253 A1 * | 5/2005 | Pajukoski et al. | ............ | 455/63.1 |

* cited by examiner

*Primary Examiner* — David Lugo
(74) *Attorney, Agent, or Firm* — Rogers S. Burleigh

(57) ABSTRACT

A method for simplifying calculations for pre-whitening in a G-RAKE receiver, comprising receiving at least two signals with at least two antennas via a channel, where each one of said received signals comprises time delayed and attenuated versions of the original signals. Each received signal forms a corresponding vector of received signal versions and the vectors form a matrix of received signals, where, due to correlation between the antennas, the received signals are correlated. Each version also comprises a certain amount of colored noise. The correlating effect of the antennas is estimated and formulated in matrix form and used to acquire essentially uncorrelated received signal vectors in an essentially uncorrelated received signal matrix. A calculated inverse of a covariance matrix of the calculated essentially uncorrelated signal vectors is used to pre-whiten the noise. A G-RAKE receiver arranged for applying the method above.

12 Claims, 3 Drawing Sheets

METHOD FOR SIMPLIFYING THE CALCULATIONS FOR PRE-WHITENING IN A G-RAKE RECEIVER

TECHNICAL FIELD

The present invention relates to a method for simplifying the calculations for pre-whitening in a G-RAKE receiver, where the method comprises the following step: receiving at least two signals by means of at least two antennas via a channel, where, due to the channel, each one of said received signals comprises time delayed and attenuated versions of the original signals, each received signal forming a corresponding vector of received signal versions and the vectors forming a matrix of received signals, where, due to correlation between the antennas, the received signals are correlated, each version also comprising a certain amount of coloured noise.

The present invention also relates to a G-RAKE receiver arranged for receiving at least two signals by means of at least two antennas via a channel, where, due to the channel, each one of said received signals comprises time delayed and attenuated versions of the original signals, each received signal forming a corresponding vector of received signal versions and the vectors forming a matrix of received signals, where, due to correlation between the antennas, the received signals are correlated, each version also comprising a certain amount of coloured noise.

BACKGROUND

In a wireless communication, there is a radio channel between a current transmitter and a current receiver. The radio channel affects a time-dependent transmitted signal x(t) in such a way that a corresponding time-dependent revived signal y(t) differs from x(t). For example, x(t) is attenuated in the channel, and due to reflections in the channel, the transmitted signal is divided into several signals following different signal paths. These signals are received with different time delays due to differences in path length.

The received signal y(t) thus consists of a number of different versions of the transmitted signal, x(t), which are attenuated and time delayed. This is written as $$y(t) = \sum_{k=0}^{n} x(t-\tau_k)h(k) + z(t),$$

where $\tau_k$ is a certain delay time, h(k) is the attenuation and z(t) is noise. The letter "n" denotes the number of received versions of the transmitted signal. These time delays cause a spread in time that gives rise to so-called inter-symbol interference (ISI), and there is thus a need for compensating for this. One type of receiver that compensates for such a receiver is a so-called RAKE receiver.

A RAKE receiver Q, as shown in prior art FIG. 1, works by having a number N of "fingers" F1, F2 . . . FN, where each finger F1, F2 . . . FN is a branched signal path having a certain amplification A1, A2 . . . AN and time delay D1, D2 . . . DN. By estimating the correct delay and amplification for each finger F1, F2 . . . FN, the received signal is recovered by means of de-spreading of the received signals y(t). All the fingers F1, F2 . . . FN are then added to a common output from the RAKE receiver Q, where a decision is taken in a decision module C regarding which symbol a certain signal refers to. The estimation of the delays D1, D2 . . . DN is performed by means of pilot signals, which are known in advance, and transmitted regularly. These delays D1, D2 . . . DN can be estimated by an auto-correlation of the received pilot signals.

The RAKE receiver Q suffers from a problem relating to noise z(t) in the received signal y(t). The decision made in the decision module C is optimal in the maximum likelihood sense if, and only if, the noise is white. Typically, the noise is coloured, which makes the RAKE receiver suboptimal. A remedy to this shortcoming is to use a pre-whitening approach, this is also known as the generalized-RAKE receiver (G-RAKE). The pre-whitening is done by acquiring a covariance matrix R of the received signal y(t) when y(t)=z(t), i.e. when there is no transmission, and inverting said covariance matrix R. The inverse $R^{-1}$ of the covariance matrix R is used to compute the combining weights A1 . . . AN in FIG. 1. This is indicated with dashed-lines in FIG. 1.

For reasons of simplicity, in the following we will assume that the G-RAKE receiver is equipped with two antennas, but of course the following principles are valid for any number of antennas. The covariance matrix $R_y$ for the received signal y(t) is written as:

$$R = E\left\{\begin{bmatrix} y_1 \\ y_2 \end{bmatrix}\begin{bmatrix} y_1^H & y_2^H \end{bmatrix}\right\} = \begin{bmatrix} R_{11} & R_{12} \\ R_{21} & R_{22} \end{bmatrix}$$

where $y_1$ is a signal vector received by a first antenna and $y_2$ is a signal vector received by a second antenna. All the vectors are time-dependent although this, for reasons of simplicity, is not indicated. The superscript $^H$ denotes that the vector/matrix in question is Hermite transposed, i.e. it denotes that it is a transposed complex conjugate.

Each signal vector is of the size M×1, where M is a number of received samples, which number M is chosen such that the delay spread can be modelled. That is, the number M is chosen large enough to describe all significant time delays in a received signal. This means that the covariance matrix R is a 2M×2M matrix. Each of the four submatrices $R_{rc}$ is thus of the size M×M.

As the inverted covariance matrix R is used to whiten the noise, there is a quite complicated matrix inversion that has to take place in order to acquire $R^{-1}$. A 2M×2M matrix requires approximately $8M^3$ operations to be inverted. There is thus a demand for a method for facilitating this inversion.

SUMMARY

The problem that is solved by the present invention is to provide a method and arrangement to reduce the number of operations when inverting the covariance matrix in a G-RAKE receiver.

This problem is solved by means of a method as mentioned initially. Said method further comprises the following steps:

Estimating the de-correlating effect of the antennas; formulating said estimate in matrix form; acquiring essentially uncorrelated received signal vectors in an essentially uncorrelated received signal matrix by multiplying the received signal matrix with the inverse of said estimate in matrix form; and using a calculated inverse of a covariance matrix of the calculated essentially uncorrelated signal vectors to pre-whiten the noise, where said covariance matrix thus essentially is a block diagonal matrix.

The problem is also solved by means of a G-RAKE receiver as mentioned initially. The G-RAKE receiver is further arranged for estimating the de-correlating effect of the antennas by formulating said estimate in matrix form and multiplying the received signal matrix with the inverse of said estimate in matrix form in order to acquire essentially uncorrelated received signal vectors in an essentially uncorrelated received signal matrix, where the G-RAKE receiver further is arranged for applying a calculated inverse of a covariance matrix of the calculated essentially uncorrelated signal vectors to pre-whiten the noise, where said covariance matrix thus essentially is a block diagonal matrix.

In one preferred embodiment, the pre-whitening of the noise is performed by multiplying the respective received signal with the inverse of said covariance matrix.

In another preferred embodiment, the pre-whitening of the noise is performed by using the inverse of said covariance matrix to calculate correct amplification weights for each finger in the G-RAKE receiver in such a way that the received signal is recovered by means of de-spreading of the received signals and at the same time is essentially pre-whitened.

In a further preferred embodiment, said estimate in matrix form comprises the correlation between the antennas in the form of a coupling factor and a gain factor.

In a further preferred embodiment, the calculated signal vectors are scaled with a factor, for example the gain factor, in the estimate in matrix form ($W^T$), such that the estimate in matrix form $W^T$ acquires a diagonal that is constant, forming a different estimate in matrix form $\tilde{W}^T$.

The major advantage achieved by means of the present invention, is that the number of operations when inverting the covariance matrix in a G-RAKE receiver is reduced by, approximately, a factor of four.

BRIEF DESCRIPTION OF DRAWINGS

The present invention will now be described more in detail with reference to the appended drawings, where.

DETAILED DESCRIPTION

Figure 1:
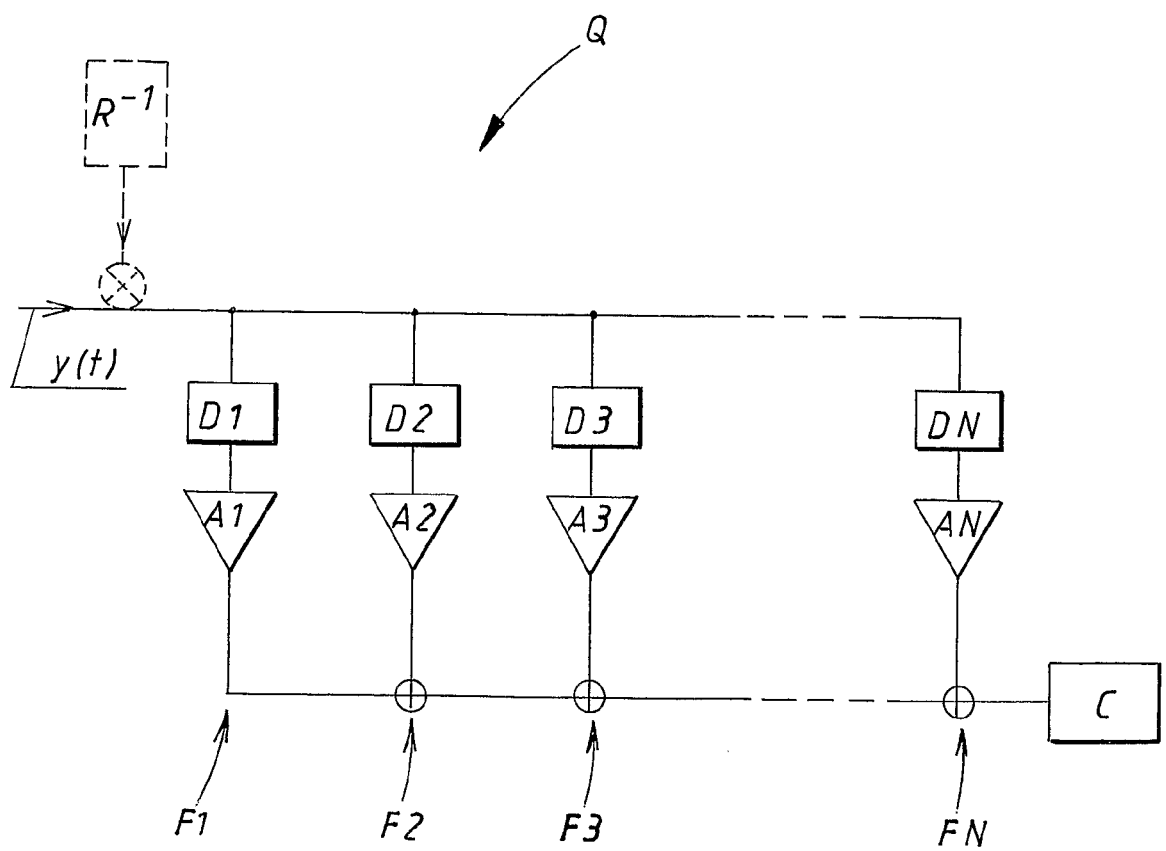
FIG. 1 schematically shows a RAKE receiver according to the state of the art.
Figure 2:
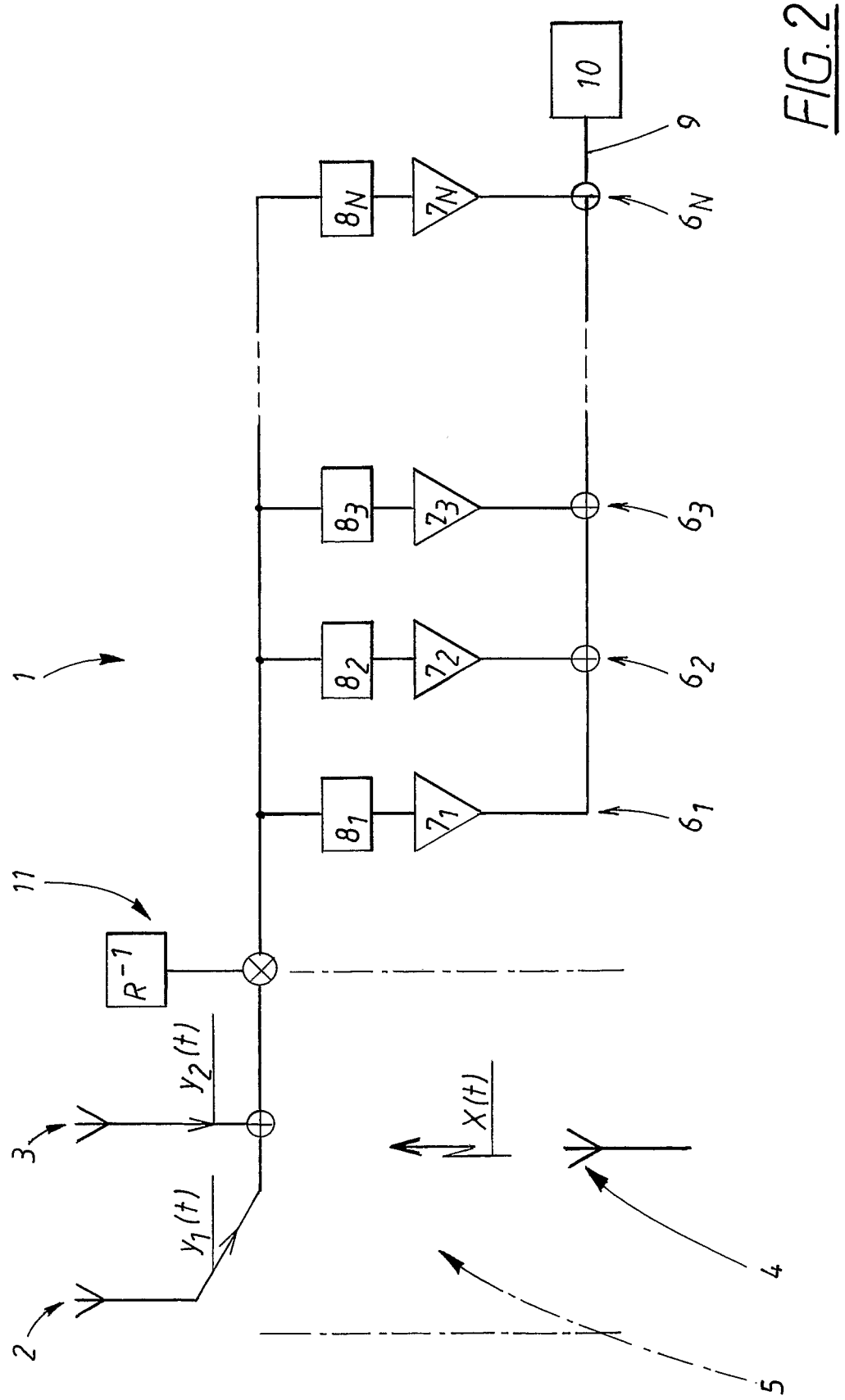
FIG. 2 schematically shows a G-RAKE receiver to which the present invention is applied.

With reference to FIG. 2, a G-RAKE receiver 1 is equipped with two antennas 2, 3. The antennas 2, 3 receive a respective time-dependent signal $y_1(t)$, $y_2(t)$ that originates from a transmitted time-dependent signal $x(t)$, transmitted by a transmitting antenna 4. Between the transmitting antenna and the receiving antennas there is a channel 5. Due to reflections in the channel 5, the transmitted signal is divided into several signals following different signal paths. These signals are received with different time delays due to differences in path length.

Each one of the received signals $y_1(t)$, $y_2(t)$ thus consists of a number of different versions of the transmitted signal $x(t)$, which are attenuated and time delayed. For a general received signal $y(t)$, this is written as $$y(t) = \sum_{k=0}^{n} x(t - \tau_k)h(k) + z(t), \qquad (1)$$

where $\tau_k$ is a certain delay time, $h(k)$ is the attenuation and $z(t)$ is noise. The letter "n" denotes the number of received versions of the transmitted signal.

The G-RAKE receiver 1 has a number N of "fingers" $6_1, 6_2, 6_3, 6_N$, where each finger $6_1, 6_2, 6_3, 6_N$ is a branched signal path having a certain amplification $7_1, 7_2, 7_3, 7_N$ and time delay $8_1, 8_2, 8_3, 8_N$. By estimating the correct amplification $7_1, 7_2, 7_3, 7_N$ and delay $8_1, 8_2, 8_3, 8_N$ for each finger $6_1, 6_2, 6_3, 6_N$, the received signal is recovered by means of de-spreading of the received signals $y_1(t)$, $y_2(t)$. All the fingers $6_1, 6_2, 6_3, 6_N$ are then added to a common output 9 from the G-RAKE receiver 1, where a decision is taken in a decision module 10 regarding which symbol a certain signal refers to. The estimation of the delays $8_1, 8_2, 8_3, 8_N$ is performed by means of pilot signals, which are known in advance, and transmitted regularly. These delays $8_1, 8_2, 8_3, 8_N$ can be estimated by an auto-correlation of the received pilot signals.

In order to pre-whiten the noise $z(t)$ in the received signals $y_1(t)$, $y_2(t)$, the inverse $R_y^{-1}$ of the covariance matrix $R_y$ of the received signals $y_1(t)$, $y_2(t)$ is convoluted with the received signal $y_1(t)$, $y_2(t)$. This is indicated with a multiplying unit 11 in FIG. 2. In the following, the received signals $y_1(t)$, $y_2(t)$ will be represented by respective time-dependent signal vectors $y_1$ and $y_2$, each vector containing the different versions of the received signal in question, which signal vectors $y_1$ and $y_2$ are written as $$Y = [y_1 y_2] \qquad (2)$$

For reasons of simplicity, the vectors and matrix elements used in the following are time-dependent if not otherwise indicated. The number of elements M in $y_1$ respective $y_2$ is chosen such that the delay spread can be modelled. That is, the number M is chosen large enough to describe all significant time delays in a received signal. In the following, $R_{y11}$ and $R_{y22}$ are the respective correlations of the received signals, while $R_{y12}$ and $R_{y21}$ are the respective cross-correlations of the received signals. These matrixes $R_{y11}, R_{y22}, R_{y12}$ and $R_{y21}$ are all of the size M×M. The covariance matrix $R_y$ is thus written as $$R_y = E\{vec(Y)vec(Y)^H\} \approx \frac{1}{K}\sum_{k=1}^{K} vec(Y(k))vec(Y^H(k)). \qquad (3)$$

The function "vec(Y)" denotes the vectorization of the matrix Y formed by stacking the columns of Y into a single column vector. The function "vec" is general and valid for all matrixes.

This results in $$R_y = \begin{bmatrix} R_{y11} & R_{y12} \\ R_{y21} & R_{y22} \end{bmatrix} \qquad (4)$$

where, for example, $$R_{y11} \approx \frac{1}{K}\sum_{k=1}^{K} y_1(k)y_1^H(k). \qquad (5)$$

Normally, due to coupling between the receiving antennas 2, 3, the received signals $y_1$ and $y_2$ are not uncorrelated, and thus $R_{y12}$ and $R_{y21}$ have non-zero values, and will have to be taken into account when the covariance matrix $R_y$ is inverted.

According to the present invention, the received signals $y_1$ and $y_2$ are calculated just before they are influenced by the antennas, these signals being denoted as $s_1$ and $s_2$. The signals $s_1$ and $s_2$ are thus uncorrelated, and thus the corresponding correlations $R_{s12}$ and $R_{s21}$ will be zero, and then a covariance matrix $R_s$ according to the following is acquired:

$$R_s = \begin{bmatrix} R_{s11} & 0 \\ 0 & R_{s22} \end{bmatrix}. \quad (6)$$

The received uncorrelated signals, i.e. just before they are influenced by the antennas, are written as $$S = [s_1 s_2], \quad (7)$$

and the covariance matrix $R_s$ is thus written as $$R_s = E\{\text{vec}(S)\text{vec}(S)^H\}. \quad (8)$$

The inversion of the covariance matrix $R_s$ according to equation (8) is simplified, since it is known that for general matrixes A, B and C, the following may be written:

$$A = \begin{bmatrix} B & 0 \\ 0 & C \end{bmatrix} \Rightarrow A^{-1} = \begin{bmatrix} B^{-1} & 0 \\ 0 & C^{-1} \end{bmatrix} \quad (9)$$

since A has a so-called block diagonal.

Then, in the present case, only the M×M matrixes $R_{s11}$ and $R_{s22}$ will have to be inverted in order to obtain the inverted covariance matrix $R_s$. This requires approximately $2M^3$ operations, which means that the complexity of the problem is reduced four times when the inversion is performed on $R_s$ instead of $R_y$.

In order to acquire the uncorrelated received signals $s_1$ and $s_2$, the present invention sets out to estimate the coupling effects between the receiving antennas.

The de-correlating effect of the coupling in the antennas is a 2×2 matrix that is written as $$W = \begin{bmatrix} w_{11} & w_{12} \\ w_{21} & w_{22} \end{bmatrix} \quad (10)$$

The following equation is then formulated:

$$Y = SW^T \quad (11)$$

In short, the uncorrelated received signal vectors $s_1$ and $s_2$ are acquired by multiplying the above expression $Y = SW^T$ with the inverse of $W^T$. For this purpose, $W^T$ is first estimated, and then $(W^T)^{-1}$ is calculated. This calculation is trivial, since $W^T$ is a 2×2 matrix.

Before explaining the estimation of $W^T$ more in detail, the Kronecker product is defined according to the following:

If A is an m-by-n matrix and B is a p-by-q matrix, then the Kronecker product $A \otimes B$ is the mp-by-nq block matrix $$A \otimes B = \begin{bmatrix} a_{11}B & \cdots & a_{1n}B \\ \vdots & \ddots & \vdots \\ a_{m1}B & \cdots & a_{mn}B \end{bmatrix} \quad (12)$$

Equation (11) is now written as $$Y = I_M SW^T \quad (13)$$

where $I_M$ is the identity matrix of dimension M.

It is generally known that $\text{vec}(ABC) = C^T \otimes A \, \text{vec}(B)$.

Now, using the relationship above, equation (13) can be written as follows using the Kronecker product:

$$\text{vec}(Y) = W \otimes I_M \text{vec}(S) \quad (14)$$

Rewriting equation (3) using equation (14) yields:

$$R_y = W \otimes I_M E\{\text{vec}(S)\text{vec}(S)^H\} W^H \otimes I_M \quad (15)$$

From equation (8) it is known that $R_s = E\{\text{vec}(S)\text{vec}(S)^H\}$, and in order to calculate $R_s$ from equation (14), the expression in equation (14) is multiplied with $$(W \otimes \text{vec}(I_M))^{-1} = W^{-1} \otimes \text{vec}(I_M). \quad (16)$$

As stated previously, $W^{-1}$ has to be calculated, which follows from equation (15). This calculation is trivial, since W is a 2×2 matrix.

Now, a covariance matrix $R_s^{-1}$ may be calculated using the uncorrelated received signals (signal vectors) $s_1$ and $s_2$. Then $R_s^{-1}$ is calculated as $$R_s^{-1} = \begin{bmatrix} R_{s11}^{-1} & 0 \\ 0 & R_{s22}^{-1} \end{bmatrix} \quad (17)$$

This reduces the number of required operations with a factor of four as stated above.

Figure 3:
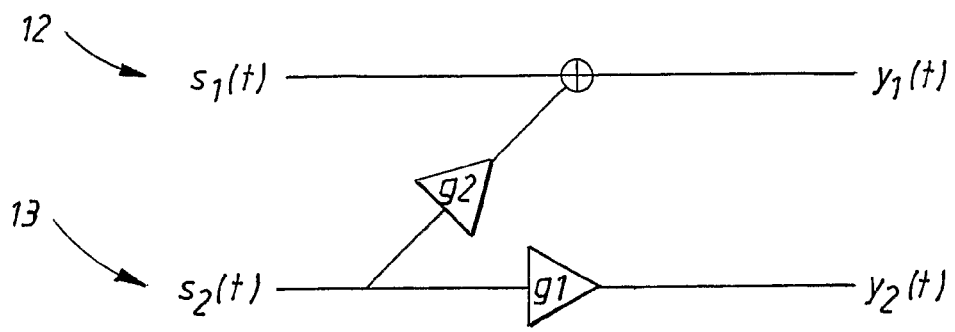
FIG. 3 schematically shows a model of two antennas.

In order to estimate $W^T$, the coupling of the antenna is estimated in a model as shown in FIG. 3. The received but yet uncorrelated signals, not yet having been influenced by the antennas, are $s_1(t)$ and $s_2(t)$, while the received correlated signals are $y_1(t)$ and $y_2(t)$, respectively. In the model there is a first antenna 12 and a second antenna 13, where a first factor $g_1$ relates to the gain in the second antenna 13 and the second factor $g_2$ relates to the coupling between the antennas 12, 13.

Using the model according to FIG. 3 leads to that the relationship $Y = SW^T$ becomes $$[y_1 \quad y_2] = [s_1 \quad s_2] \begin{bmatrix} 1 & 0 \\ g_2 & g_1 \end{bmatrix} \quad (18)$$

The problem now is to find the factors $g_1$ and $g_2$. The model described by means of equation (18) does, however, pose a problem, since we can not determine $g_1$. One remedy to this problem is to consider $g_1$ as a part of the signal $s_2$. Equation (18) is then re-formulated in such a way that the matrix $W^T$ acquires a diagonal that is constant. This is achieved by moving some terms to the matrix S, which then of course becomes slightly different; $\tilde{S}$. This also affects the matrix W, which also becomes slightly different; $\tilde{W}$. If this re-writing is performed on the antenna model according to FIG. 3, equation (18) is re-written as $$[y_1 \quad y_2] = [s_1 \quad \tilde{s}_2] \begin{bmatrix} 1 & 0 \\ g_2 & 1 \\ g_1 & \end{bmatrix} = \tilde{S}\tilde{W}^T, \quad (19)$$

where $$\tilde{s}_2 = s_2 g_1. \quad (20)$$

Inserting equation (18) into equation (15) leads to:

$$R_y = \begin{bmatrix} I_M & g_2 I_M \\ 0 & g_1 I_M \end{bmatrix} \begin{bmatrix} R_{s11} & 0 \\ 0 & R_{s22} \end{bmatrix} \begin{bmatrix} I_M & 0 \\ g_2^* I_M & g_1^* I_M \end{bmatrix} \quad (21)$$

$$= \begin{bmatrix} R_{s11} + |g_2|^2 R_{s22} & g_1^* g_2 R_{s22} \\ g_1 g_2^* R_{s22} & |g_1|^2 R_{s22} \end{bmatrix}$$

Since $R_y$ is measured, the terms of the rightmost matrix in equation (20) are known.

We now combine the equations (15) and (19):

$$R_y = \tilde{W} \otimes I_M E\{\text{vec}(\tilde{S})\text{vec}(\tilde{S})^H\} \tilde{W}^H \otimes I_M, \quad (22)$$

where $$R_{\tilde{s}} = E\{\text{vec}(\tilde{S})\text{vec}(\tilde{S})^H\} \quad (23)$$

In order to find $R_{\tilde{s}}$, we multiply the rightmost matrix in equation (20), which equals $R_y$, with $(\tilde{W})^{-1}$ from the left and with $(\tilde{W}^H)^{-1}$ from the right. This yields $$R_{\tilde{s}} = \begin{bmatrix} R_{s11} & 0 \\ g_1 R_{s22}\left(g_2^* - \left(\frac{g_2}{g_1}\right)^* g_1^*\right) & R_{s22}|g_1|^2 \end{bmatrix} \quad (24)$$

$$= \begin{bmatrix} R_{s11} & 0 \\ 0 & R_{s22}|g_1|^2 \end{bmatrix}$$

These kinds of calculations may also be applied if a more complicated antenna model than the one shown in FIG. 3 is used, where all the elements of the matrix $W^T$ may comprise unknowns. This is the case if, for example, cross-coupling between the antennas is taken into account.

Figure 4:
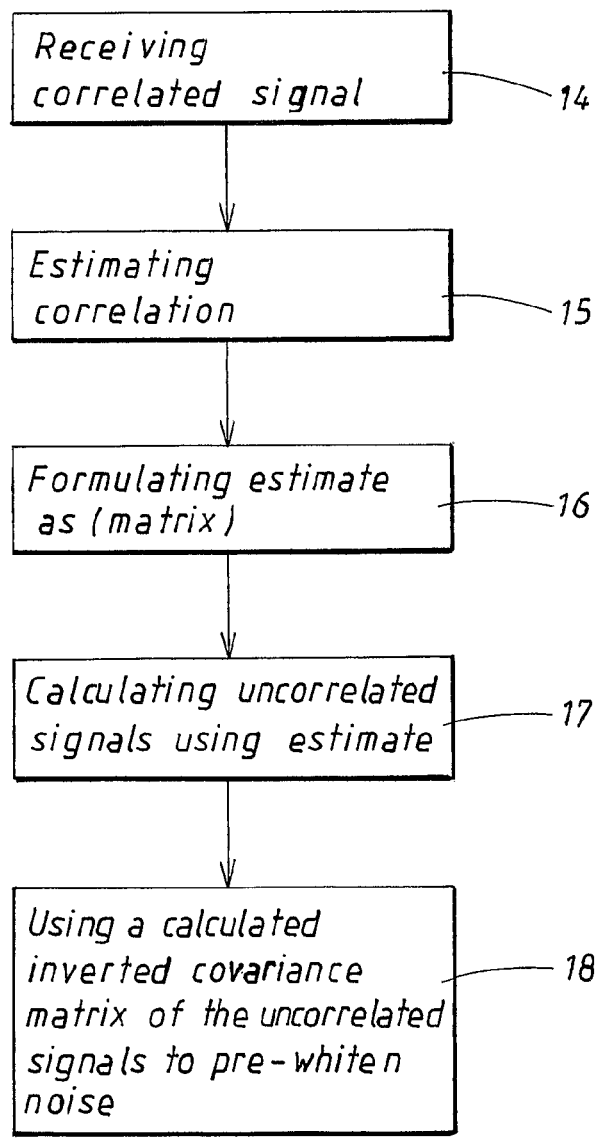
FIG. 4 is a block diagram showing the method according to the invention.

With reference to FIG. 4, the method according to the present invention comprises the following method steps:

14: Receiving at least two signals $y_1(t)$, $y_2(t)$ by means of at least two antennas 2, 3 via a channel 5, where, due to the channel 5, each one of said received signals comprises time delayed and attenuated versions of the original signals $x(t)$, each received signal $y_1(t)$, $y_2(t)$ forming a corresponding vector $y_1$, $y_2$ of received signal versions and the vectors $y_1$, $y_2$ forming a matrix Y of received signals, where, due to correlation between the antennas 2, 3, the received signals $y_1$, $y_2$ are correlated, each version also comprising a certain amount of coloured noise $z(t)$;

15: Estimating the de-correlating effect of the antennas;

16: Formulating said estimate in matrix form;

17: Acquiring essentially uncorrelated received signal vectors $s_1$, $s_2$ in an uncorrelated received signal matrix S by multiplying the received signal matrix Y with the inverse of said estimate in matrix form $W^T$; and 18: Using a calculated inverse of a covariance matrix of the calculated essentially uncorrelated signal vectors to pre-whiten the noise, where said covariance matrix thus essentially is a block diagonal matrix.

The invention is not limited to the embodiment examples above, but may vary freely within the scope of the appended claims. For example, the number of antennas may be more than the two antennas in the example above, the same general principle behind the present invention is still valid.

Furthermore, the model of $W^T$ according to FIG. 3 is very simplified. As indicated above, there may be more components, for example cross-coupling between the antennas (not shown). Such a cross-coupling may occur in such a way that the coupling is uneven between the antennas, i.e. there are then two factors relating to coupling between the antennas, and these factors do not have to be equal.

The block diagonalization can be carried out directly on the signals $y_1$ and $y_2$, using the inverse of $W^T$ and apply it on the signals directly. This will then produce an estimate of the signals $s_1$ and $s_2$ which by assumption will produce a block diagonal matrix. Such a direct block diagonalization can be carried out directly on the signals.

Multiplying the respective received signal with an inverse $R_s^{-1}$ of the covariance matrix $R_s$ of the calculated essentially uncorrelated signal vectors $s_1$, $s_2$ in order to pre-whiten the noise $z(t)$ is one solution to the problem according to the present invention. This solution consumes a lot of system capacity, since calculations normally have to be made for each sample.

An example of another way to solve the problem is to use the inverse $R_s^{-1}$ to calculate the correct amplification $7_1$, $7_2$, $7_3$, $7_N$ weights for each finger $6_1$, $6_2$, $6_3$, $6_N$ in such a way that the received signal is recovered by means of de-spreading of the received signals $y_1(t)$, $y_2(t)$ and at the same time is essentially pre-whitened. An advantage of this alternative solution is that these amplification $7_1$, $7_2$, $7_3$, $7_N$ weights have to be re-calculated relatively seldom, for example when the channel is re-estimated by means of pilot signals.

The de-correlation and pre-whitening is of course never exactly perfect in real life, but the present invention provides a useful tool for acquiring an essentially pre-whitened signal for a G-RAKE receiver in a new and simplified manner.

What is claimed is:

1. A method for use in a G-RAKE receiver for simplifying the calculations for pre-whitening in the G-RAKE receiver, where the method comprises the steps of:
   receiving at least two signals, by means of at least two antennas via a channel, where, due to the channel, each one of said received signals comprises time delayed and attenuated versions of the original signals, each received signal, forming a corresponding vector of received signal versions and the vectors forming a matrix of received signals, where, due to correlation between the antennas, the received signals are correlated, each version also comprising a certain amount of colored noise;
   estimating the correlating effect of the antennas;
   formulating said estimate in matrix form;
   acquiring essentially uncorrelated received signal vectors in an essentially uncorrelated received signal matrix by multiplying the received signal matrix with the inverse of said estimate in matrix form; and
   using a calculated inverse of a covariance matrix of the calculated essentially uncorrelated signal vectors to pre-whiten the noise, where said covariance matrix thus essentially is a block diagonal matrix.

2. The method according to claim 1, wherein the pre-whitening of the noise is performed by multiplying the respective received signal, with the inverse of said covariance matrix.

3. The method according to claim 1, wherein the pre-whitening of the noise is performed by using the inverse of said covariance matrix to calculate correct amplification weights for each finger in the G-RAKE receiver in such a way that the received signal is recovered by means of de-spreading of the received signals, and at the same time is essentially pre-whitened.

4. The method according to claim 1, wherein said estimate in matrix form comprises the coupling between the antenna in the form of a coupling factor.

5. The method according to claim 1, wherein said estimate in matrix form comprises a gain factor.

6. The method according to claim 1, wherein the calculated signal vectors are scaled with a factor in the estimate in matrix form such that the estimate in matrix form acquires a diagonal that is constant, forming a different estimate in matrix form.

7. A G-RAKE receiver arranged for receiving at least two signals, by means of at least two antennas via a channel, where, due to the channel, each one of said received signals comprises time delayed and attenuated versions of the original signals, each received signal, forming a corresponding vector of received signal versions and the vectors forming a matrix of received signals, where, due to correlation between the antennas, the received signals are correlated, each version also comprising a certain amount of colored noise, the G-RAKE receiver, comprising:
- means for estimating the de-correlating effect of the antennas by formulating said estimate in matrix form and multiplying the received signal matrix with the inverse of said estimate in matrix form in order to acquire essentially uncorrelated received signal vectors in an essentially uncorrelated received signal matrix; and
- means for applying a calculated inverse of a covariance matrix of the calculated essentially uncorrelated signal vectors to pre-whiten the noise, where said covariance matrix thus essentially is a block diagonal matrix.

8. The G-RAKE receiver according to claim 7, wherein the inverse of said covariance matrix is multiplied with the respective received signal, in order to pre-whiten the noise.

9. The G-RAKE receiver according to claim 7, wherein amplification weights for each finger in the G-RAKE receiver, having such properties that the received signal is recovered by means of de-spreading of the received signals, and at the same time is essentially pre-whitened, are extracted from the inverse of said covariance matrix.

10. The G-RAKE receiver according to claim 7, wherein said estimate in matrix form comprises the coupling between the antenna in the form of a factor.

11. The G-RAKE receiver according to claim 7, wherein said estimate in matrix form comprises a gain factor.

12. The G-RAKE receiver according to claim 7, wherein the calculated signal vectors are scaled with a factor in the estimate in matrix form such that the estimate in matrix form acquires a diagonal that is constant, forming a different estimate in matrix form.

* * * * *

UNITED STATES PATENT AND TRADEMARK OFFICE
CERTIFICATE OF CORRECTION

| | | |
|---|---|---|
| PATENT NO. | : 8,213,486 B2 | Page 1 of 1 |
| APPLICATION NO. | : 12/447292 | |
| DATED | : July 3, 2012 | |
| INVENTOR(S) | : Lindgren | |

It is certified that error appears in the above-identified patent and that said Letters Patent is hereby corrected as shown below:

On the Face Page, in Field (74), under "Attorney, Agent, or Firm", in Column 2, Line 1, delete "Rogers" and insert -- Roger --, therefor.

Signed and Sealed this
Twenty-third Day of October, 2012

David J. Kappos
*Director of the United States Patent and Trademark Office*